(12) United States Patent
Wang et al.

(10) Patent No.: US 9,374,763 B2
(45) Date of Patent: Jun. 21, 2016

(54) GATING CONTROL IN A TELECOMMUNICATION SYSTEM

(75) Inventors: Jian Wang, Beijing (CN); Fredrik Lindholm, Stockholm (SE); Ralf Keller, Würselen (DE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 289 days.

(21) Appl. No.: 13/811,801

(22) PCT Filed: Apr. 27, 2011

(86) PCT No.: PCT/EP2011/056651
§ 371 (c)(1),
(2), (4) Date: Jan. 23, 2013

(87) PCT Pub. No.: WO2012/010336
PCT Pub. Date: Jan. 26, 2012

(65) Prior Publication Data
US 2013/0121255 A1    May 16, 2013

Related U.S. Application Data

(60) Provisional application No. 61/367,014, filed on Jul. 23, 2010.

(51) Int. Cl.
*H04W 4/00* (2009.01)
*H04W 40/34* (2009.01)
(Continued)

(52) U.S. Cl.
CPC ............ *H04W 40/34* (2013.01); *H04L 65/103* (2013.01); *H04L 65/104* (2013.01); *H04L 65/80* (2013.01); *H04W 36/0022* (2013.01); *H04L 65/1016* (2013.01); *H04W 76/041* (2013.01)

(58) Field of Classification Search
None
See application file for complete search history.

(56) References Cited

U.S. PATENT DOCUMENTS

2011/0238547 A1* 9/2011 Belling et al. .................. 705/34
2011/0307624 A1* 12/2011 Shatsky .............. H04L 65/4084
709/231

FOREIGN PATENT DOCUMENTS

| CN | 101047570 A | 10/2007 |
|---|---|---|
| CN | 101288320 A | 10/2008 |
| WO | WO 2010/054691 A2 | 5/2010 |

OTHER PUBLICATIONS

3rd Generation Partnership Project (3GPP)."Digital cellular telecommunications system (Phase 2+); LTE;Policy and charging control architecture" (3GPP TS 23.203 version 8.4.0 Release 8) ETSI TS 123 203 V8.4.0 (Jan. 2009).*

(Continued)

*Primary Examiner* — Chi H Pham
*Assistant Examiner* — Raul Rivas

(57) ABSTRACT

A method and system for updating or handling the update of a media path between a first user terminal and a second user terminal in a telecommunications network is provided. According to an embodiment of the present invention, the media path includes one or more gateway nodes. Each gateway node includes a gating function for gating media packets. Each gating function has an associated controlling function for controlling the gating function. Responsive to a message indicating at an update of the gating at the gating function is required, the gating function arranges for a new gating to be opened while keeping the old gating open. The gating function determines when the media has been switched to the new path. Responsive to the determination, the gating function arranges for the old gating to be closed.

27 Claims, 11 Drawing Sheets

(51) Int. Cl.
 H04W 36/00 (2009.01)
 H04W 76/04 (2009.01)
 H04L 29/06 (2006.01)

(56) References Cited

OTHER PUBLICATIONS

3rd Generation Partnership Project; Technical Specification Group Services and Architecture; Feasibility Study on Multimedia Session Continuity; Stage 2 (Release 8) II , 3GPP Standard; 3GPP TR 23.893, 3rd Generation Partnershi p Project (3GPP) , Mobile Competence Centre ., 650, Route Des Lucioles, F-06921 Sophia-Antipolis Cedex No. V2.0.0, Jun. 1, 2008, XP050364174.
NTT Docomo: "Selection of UE transfer mode with different user plane and control signalling", 3GPP Draft; S2-082731, 3rd Generation Partnership Project (3GPP), Mobile Competence Centre ; 650, Route Des Lucioles ; F-06921 Sophia-Antipolis Cedex; France, vol. SA WG2, no. Jeju; 20080407, Apr. 7, 2008, XP050265013.
3$^{rd}$ Generation Partnership Project; Technical Specification Group Services and System Aspects; Policy and charging control architecture (Release 9). 3GPP TS 23.203 v9.4.0. (Mar. 2010).
3$^{rd}$ Generation Partnership Project; Technical Specification Group Core Network and Terminals; Policy and Charging Control signaling glows and QoS parameter mapping (Release 8). 3GPP TS 29.213 v8.4.0 (May 2009).
3$^{rd}$ Generation Partnership Project; Technical Specification Group Services and System Aspects; IP Multimedia Subsystem (IMS); Stage 2 (Release 9). 3GPP TS 23.228 v9.0.0. (Jun. 2009).
3$^{rd}$ Generation Partnership Project; Technical Specification Group Services and Architecture; IP Multimedia Subsystem (IMS) Service Continuity; Stage 2 (Release 9). 3GPP TS 23.237 v9.3.0 (Dec. 2009).
3$^{rd}$ Generation Partnership Project; Technical Specification Group Core Network and Terminals; IP Multimedia (IM) Core Network (CN) subsystem IP Multimedia Subsystem (IMS) Service Continuity; Stage 3 (Release 9). 3GPP TS 24.237 v9.2.0 (Mar. 2010).
3$^{rd}$ Generation Partnership Project; Technical Specification Group Core Network and Terminals; Interconnection Border Control Functions (IBCF)—Transition Gateway (TrGW) interface, Ix Interface; Stage 3 (Release 9). 3GPP TS 29.238 v9.2.0 (Jun. 2010).
Series H: Audiovisual and Multimedia Systems: Infrastructure of audiovisual services—Communication procedures. Gateway Control Protocol: Version 2. ITU-T, H.248.1 (May 2002).
3$^{rd}$ Generation Partnership Project; Technical Specification Group Core Network and Terminals; IMS Application Level Gateway (IMS-ALG)—IMS Access Gateway (IMS-AGW); Iq Interface; Stage 3 (Release 9). 3GPP TS 29.334 v9.2.0. (Jun. 2010).
Rosenberg, et al.: An Offer/Answer Model with the Session Description Protocol (SDP). Network Working Group. RFC 3264. Jun. 2002.
3$^{rd}$ Generation Partnership Project; Technical Specification Group Services and System Aspects; IP Multimedia Subsystem (IMS) service continuity enhancements; Service, policy and interaction; Stage 2 (release 9). 3GPP TR 23.838 v9.0.0. (Jun. 2009).
3$^{rd}$ Generation Partnership Project; Technical Specification Group Services and System Aspects; General Packet Radio Services (GPRS) enhancements for Evolved Universal Terrestrial Radio Access Network (E-UTRAN) access (Release 9). 3GPP TS 23.401 v9.3.0 (Dec. 2009).
3$^{rd}$ Generation Partnership Project; Technical Specification Group Services and System Aspects; Architecture enhancements for non-3GPP accesses (Release 9). 3GPP TS 23.402 v9.3.0 (Dec. 2009).
3$^{rd}$ Generation Partnership Project; Technical Specification Group Core Network and Terminals; Policy and Charging Control over Gx reference point (Release 9). 3GPP TS 29.212 v9.1.0 (Dec. 2009).
3$^{rd}$ Generation Partnership Project; Technical Specification Group Core Network; Restoration procedures (Release 8). 3GPP TS 23.007 v8.5.0 (Sep. 2009).
3$^{rd}$ Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3 (Release 9). 3GPP TS 29.274 v9.1.0. (Dec. 2009).

* cited by examiner

GATING CONTROL IN A TELECOMMUNICATION SYSTEM

This application is a 371 of PCT/EP2011/056651, filed Apr. 27, 2011, which claims the benefit of U.S. Provisional Application No. 61/367,014, filed Jul. 23, 2010, the disclosure of which is fully incorporated herein by reference.

TECHNICAL FIELD

The present invention relates to gating control in a telecommunications network.

BACKGROUND

FIG. 1 of the accompanying drawings illustrates schematically a mobile network architecture including a General Packet Radio Service (GPRS) access network and an IP Multimedia Subsystem (IMS). The IP Multimedia Subsystem (IMS) is the technology defined by the Third Generation Partnership Project (3GPP) to provide IP multimedia services over mobile communication networks. IP multimedia services can provide a dynamic combination of voice, video, messaging, data, etc. within the same session. The IMS makes use of the Session Initiation Protocol (SIP) to set up and control calls or sessions between user terminals. The Session Description Protocol (SDP), carried by SIP signals, is used to describe and negotiate the media components of the session. Whilst SIP was created as a user-to-user protocol, the IMS allows operators and service providers to control user access to services and to charge users accordingly.

As shown in FIG. 1, managing of communications of user terminals (user equipment, UE; not shown in the figure) that connect to the network of FIG. 1 can be considered as held at three layers (or planes). The lowest layer (illustrated in the figure as "Connectivity Layer, 1"), is also referred to as the bearer or user plane, and provides the connectivity means through which signals are directed to/from UEs accessing the network. The entities within the connectivity layer 1 that connect a UE to a further network providing application services (e.g. allowing an IMS subscriber to access from his UE to IMS services provided by IMS network 3b) form a network that is referred to as an IP-Connectivity Access Network, IP-CAN. A GPRS network is an example of a IP-CAN network and, apart of the radio access nodes, includes various GPRS Support Nodes (GSNs), such as Gateway GPRS Support Nodes (GGSN) and Serving GPRS Support Nodes (SGSN). A GGSN (e.g. GGSN 2a) cooperates with one or more SGSNs, and acts as an interface between the GPRS backbone network and other networks (such as an IMS network). A middle layer (illustrated in the figure as "Control Layer, 4") implements control functions relating to the signals held by the IP-CAN network. For example, in case of an IP-CAN network comprising GPRS, part of these functions can be implemented by SGSNs and GGSNs of said IP-CAN network, and relate to the processing of signals received from, or addressing to, a UE that connects through the IP-CAN network (e.g. bearer establishment, bearer termination, etc). At the top of a UE's communication there can be further servers managing high-layer aspects of said communication (illustrated in the figure by an "Application Layer, 6" comprising one or more "Application Servers, 7").

In the illustrated example, the IMS subsystem 3 includes a core network 3a and a service network 3b. The IMS core network 3a includes nodes that send/receive signals to/from nodes in the IP-CAN network (e.g. via the GGSN 2a). In particular, the IMS 3 comprises network nodes (known as "Call Session Control Functions, CSCFs, which operate as SIP proxies, and which are arranged to communicate with nodes of an IP-CAN network that perform connectivity and control functions (e.g. with a GGSN, 2a). An example of such a kind of CSCF in a IMS is the so called Proxy-CSCF, P-CSCF.

The 3GPP architecture defines three types of CSCFs: the Proxy CSCF (P-CSCF) which is the first point of contact within the IMS for a SIP terminal; the Serving CSCF (S-CSCF) which provides services to the user that the user is subscribed to; and the Interrogating CSCF (I-CSCF) whose role is to identify the correct S-CSCF and to forward to that S-CSCF a request received from a SIP terminal via a P-CSCF. Application Servers (AS) 7 can be provided for implementing some of IMS service functionality. For example, an AS 7 can receive and process signalling related to a UE (i.e. as received from an IP-CAN network to which said UE attaches) so as to control higher layer aspects of a service (e.g. divert an incoming call to a voice mail service, or forward it to a certain terminal, etc).

The 3GPP specification TS 23.203 (V9.3.0) discloses a Policy and Charging Control architecture (PCC). Among other functional nodes, it discloses the functionality of: the Policy and Charging Rules Function (PCRF), Policy and Charging Enforcement Function (PCEF) and Bearer Binding and Event Reporting Function (BBERF), which interact among them (through the so-called "Gx" and "Gxx" interfaces) so as to apply policy and charging rules to the data bearer(s) set up for a user terminal (UE). In short, a PCRF is a PCC rules decision node, whilst a PCEF or a BBERF are functional entities implemented in gateway nodes routing media of the related bearer(s) and enforcing said PCC rules; e.g. a GGSN or a Packet Data Network Gateway (PDN-GW, also referred herein as PGW) can implement PCEF functions.

FIGS. 2A to 2C of the accompanying drawings are taken from 3GPP specification TS 23.203, and show an overall PCC logical architecture; FIG. 2A is simplified for the case of non-roaming UEs. The architecture shown in FIG. 2 is envisaged for an Evolved Packet System (EPS) which is also adapted for interworking with nodes of legacy mobile packet systems. The EPS system referred in 3GPP TS 23.203, which incorporates PCC specific elements, is an example of an Internet Protocol Connectivity Access Network, IP-CAN. PCC has been specified for flow based charging and policy control of IP CANs (e.g. GPRS, I-WLAN, EPC, Fixed Broadband, etc.).

In particular, FIG. 2A illustrates an overall PCC logical architecture (non-roaming), and is derived from FIG. 5.1.1 of 3GPP TS 23.203; FIG. 2B illustrates an overall PCC architecture (roaming with home routed access), and is derived from FIG. 5.1.2 of 3GPP TS 23.203; and FIG. 2C illustrates an overall PCC architecture for roaming with PCEF in visited network (local breakout), and is derived from FIG. 5.1.3 of 3GPP TS 23.203.

In cellular telecommunication systems that employ dynamic Policy and Charging Control (PCC), such as 3GPP-based systems like the EPS and 2G/3G-GPRS or non-3GPP based systems like HRPD and WiMax, the PCEF interacts with the Online Charing System (OCS) over an interface known as the Gy interface. The PCEF also interacts with the PCRF over an interface known as the Gx interface. The BBERF performs so-called bearer management in the Access Network, and carries out event reporting to the PCRF over an interface known as the Gxx interface. The BBERF interacts with the PCEF via an interface known as the S5/S8 interface that is based on the Proxy Mobile IP (PMIP) protocol.

In the 3GPP PCC architecture [3GPP TS 23.203] an IP-CAN session is an association between a UE represented by an IPv4 and/or an IPv6 address, and UE identity information, if available, and a Packet Data Network (PDN) represented by a PDN identifier (e.g. an Access Point Name, APN). An IP-CAN session can incorporate one or more IP-CAN bearers. Support for multiple IP-CAN bearers per IP-CAN session is IP-CAN specific. Further on an IP-CAN session exists as long as UE IP addresses are established and announced to the IP network. There are different IP-CAN access types envisaged by the current PCC standards; for example 3GPP-EPS, 3GPP-GPRS, 3GPP2, xDSL, Wimax, etc.

In particular, the specification 3GPP TS 23.401 describes a particular case of the PCC network architecture of 3GPP TS 23.203 for the so-called "3GPP accesses" (GERAN/UTRAN/E-UTRAN—abbreviations for GSM EDGE Radio Access Network/Universal Terrestrial Radio Access Network/Evolved UTRAN), also referred as "3GPP-EPS"; and the specification 3GPP TS 23.402 describes a particular case of the PCC network architecture of 3GPP TS 23.203 for the so-called "non-3GPP accesses".

An "IP-CAN domain" represents a set of access network entities which names and associated functions are dependent on the particular IP-CAN access type (IP connectivity access type). For example, an IP-CAN domain can include, among other: "e Node B" (eNB, or Evolved Node B), "Mobility Management Entity" (MME), "Serving Gateway" (SGW), "PDN Gateway" (PGW) and so on. In particular, a SGW is used to implement the BBERF functionality in case PMIP based S5/S8 is used, and a PGW uses to implement the PCEF functionality.

The PCC architecture defined in 3GPP TS 23.203 is intended to apply policy and charging control (PCC) in IP-CAN networks, such as Evolved Packet System (EPS) networks that includes both 3GPP accesses (GERAN/UTRAN/E-UTRAN) and Non-3GPP accesses, according to TS 23.401 and TS 23.402. PCC functionality is basically implemented by nodes of an IP-CAN network that perform connectivity and basic control functions (e.g. gateways such as SGW, PGW or GGSN implementing PCEF or BBERF functions) in cooperation with nodes implementing policy decision functions (i.e. nodes implementing PCEF functionality). Some of the PCC functionalities described by 3GPP TS 23.203 can also be achieved in cooperation with "Application Functions" AF (e.g. application servers 7 in FIG. 1) which communicate with a PCEF. An example of an "Application Function" AF is a P-CSCF of an IP Multimedia Subsystem IMS.

An EPS compliant architecture needs to support both PCEF and PCRF functionality to enable dynamic policy and charging control by means of installation of PCC rules on the IP-CAN session based on user (i.e. UE user) and service. For example, in case of 3GPP-EPS network, during E-UTRAN initial attach procedure of a UE, the PCEF initiates a IP-CAN control signalling session (e.g. a session according to DIAMETER protocol for the PDN connection between PCEF and PCRF. In addition in case of PMIP based S5/S8 interface, the BBERF must also setup a DIAMETER session for that PDN connection of the UE.

Referring to the simplified architecture for supporting Policy and Charging Control (PCC) functionalities as illustrated in FIG. 2A (a similar description would apply to FIGS. 2B and 2C), the PCRF 1A is a functional element that encompasses policy control decision and flow based charging control functionalities. The PCRF 1A provides network control regarding the service data flow detection, gating, QoS and flow based charging (except credit management) towards the PCEF 2A. The PCRF can receive session and media related information from an Application Function (AF) 3A and can also inform the AF of traffic plane events. The PCRF provisions PCC Rules to the PCEF 2A via the Gx reference point.

The PCEF 2A is a functional element that encompasses policy enforcement and flow based charging functionalities. This functional entity is located at a gateway node 4A of the network (e.g. GGSN in the GPRS case, and PDG in the WLAN case). The PCEF provides control over user plane traffic handling at the gateway 4A and in particular over the applied Quality of Service (QoS). It provides service data flow detection and counting as well as online and offline charging interactions, e.g. towards the OCS 5A and OFCS 6A. FIG. 2A also illustrates a Bearer Binding and Event Reporting Function (BBERF) and Subscriber Profile Repository.

The AF 3A is a functional element implementing applications for which a service is delivered to a user terminal (UE) The AF 3A controls IP bearer resources in order to satisfy the requirements of the service. One example of an AF 3A is a Proxy Call Service Control Function (P-CSCF) of an IP Multimedia Subsystem (IMS) core network. The AF 3A communicates with the PCRF 1A to transfer dynamic session information. This communication is performed using the Rx interface.

A packet data flow (such as an IP flow) is a set of data packets (e.g. IP packets) passing a routing node in a packet data network during a certain time interval, to or from the same endpoints. For example, a packet flow may be an IP flow, where each packet of the flow contains the same values of source IP address, source transport layer port (e.g. TCP), destination IP address and destination transport layer port.

When a User Equipment (UE) initiates a data session (e.g. an IP-CAN session), a packet data network address, such as an IP address, is assigned to it by an appropriate access gateway, e.g. the GGSN. The PCEF within the gateway provides this IP address, together with, for example, an NAI, IMSI, or MSISDN, to the PCRF which in turn downloads into the PCEF a set of policy rules to be applied to the data session. When the UE communicates with an AF, e.g. a P-CSCF in the case of an IMS service architecture, the AF provides session details to the PCRF. When the UE subsequently requests resources for the service provided by the AF, the PCRF downloads into the PCEF a further set of policy rules based on the session details provided by the AF.

The policy control features comprise gating control and QoS control. Gating control is applied by the PCEF (Policy and Charging Enforcement Function) on a per service data flow basis. To enable the PCRF gating control decisions, the AF (e.g. P-CSCF) has to report session events (e.g. session termination, modification) to the PCRF (Policy and Charging Rules Function). For example, session termination, in gating control, may trigger the blocking of packets or "closing the gate" [Policy and charging control architecture, 3GPP 23.203 V9.4.0].

In the PCC architecture, IP CAN session modification procedure is defined as set out in FIG. 3 of the accompanying drawings.

Referring to FIG. 3, in step 1, the AF (e.g. P-CSCF in the IM CN subsystem) may provide/revoke service information to the PCRF due to AF session signalling.

In step 5, the PCRF sends the Policy and Charging Rules Provision (PCC Rules, Event Trigger, Event Report) to the PCEF. And in step 6, the PCEF enforces the decision.

An example of IP CAN session modification is when there is an IMS session modification. That is, the P-CSCF (acting as AF) receives the SDP parameters defined by the originator within an SDP offer in SIP signalling, and it identifies the relevant changes in the SDP. So the P-CSCF sends to the PCRF a Diameter AAR for an existing Diameter session and includes the derived updated service information. The PCRF stores the received updated session information and identifies the affected established IP-CAN Session(s), and sends information to the PCEF so that the PCEF can enforce the update [Policy and Charging Control signalling flows and QoS parameter mapping, 3GPP 29.213 V8.4.0].

In additional to the gating using the PCC architecture, gating can be done in additional intermediate nodes in the IMS network, such as the IBCF/TrGW and the IMS ALG/IMS AGW [IP Multimedia Subsystem (IMS), stage 2, 3GPP 23.228 V9.0.0]. The interaction with the GW for the gating part is done similar to PCC, i.e., when a SDP answer/200 OK is received, the controlling function (IBCF or IMS ALG) instructs the media gate in the media node (TrGW or IMS AGW) to open up for the new media.

The present applicant has identified the following technical issue with the above-described arrangements.

As specified in [Policy and Charging Control signalling flows and QoS parameter mapping, 3GPP 29.213 V8.4.0], the enabling of IP Flows procedure is triggered by the P-CSCF receiving any 2xx success response to an INVITE request or a 2xx success response to an UPDATE request within a confirmed dialogue (in both cases a 200 OK response is usually received). Only when receiving such responses, the PCRF will interact with PCEF to open/close gate for IP flow(s). Similar applies for the IBCF/TrGWs and IMS ALG/IMS AGW, the interaction with the GW to open (or change) the gate is done when the 200 OK is received.

This mechanism can be problematic with Access Transfer as specified in [IP Multimedia Subsystem (IMS) Service Continuity, 3GPP 23.237 V9.3.0]. Access Transfer is transfer at the IMS-level of one or more media paths of an ongoing IMS session on one UE between Packet Switched (PS) to Circuit Switched (CS) access; or transfer at the IMS-level of both the signalling and the media path of an ongoing IMS session on a UE between different IP-CANs. It includes PS-CS access transfer (both directions in some cases) and PS-PS access transfer. If there is a change of IP address for the UE, during the access transfer the media path will be broken. For example, refer to the call flow of FIG. 4 of the accompanying drawings [IP Multimedia Subsystem (IMS) Service Continuity; Stage 3, 3GPP 24.237 V9.2.0].

Referring to FIG. 4, at step 10, the 200 OK will first reach the P-CSCF of UE B (not shown in the figure). The P-CSCF of UE B will then inform the corresponding PCRF with the updated SDP information. And accordingly the PCRF will control the gating in the PCEF (e.g. GGSN). From now on, the IP flows between UE A and UE B is broken, as PCEF has been ordered to gate the IP flows from the new IP address of UE A, while UE A has not yet started to use this new IP address as it has not yet received the SDP answer from UE B.

Any intermediate gating, such as IBCF/TrGW etc, will not update their gates until the SDP answer is received. This means that the network may not be in synch between the different gating functions in originating and terminating networks. Some still allows the media to flow to/from the old IP address, some to/from the new IP address.

When the 200 OK reaches the P-CSCF of the UE A (step 15), it informs the corresponding PCRF, and PCRF controls the gating in the PCEF for UE A. From now on, the IP flows between UE A and UE B resume, as only at this time, all gates in the network are in sync again.

It can be seen, if the two UEs are located in different networks, that the voice path break between step 10 and 15 can be significant, and be longer than 300 ms. Hence it is audible and impacts the perceived service quality.

A more complete view of the situation is shown in FIG. 5 of the accompanying drawings.

There may be one or more Interconnection Border Control Function (IBCF) along the media path. Each IBCF will control a Transition Gateway (TrGW). The interface between IBCF and TrGW is Ix [Interconnection Border Control Functions (IBCF)—Transition Gateway (TrGW) interface, Ix Interface; Stage 3, 3GPP 29.238 V9.2.0], which is based on H.248. When the media path changes, IBCF will need to change the gate in TrGW (not shown). H.248 has defined a service change method "Graceful" for taking a Termination out of service after a specified time of delay [Gateway control protocol: Version 2, ITU-T H.248.1]. However, this existing mechanism may need to be enhanced as well.

Similarly, the interface between P-CSCF (IMS ALG) and IMS AGW is Iq, which is also based on H.248 [IMS Application Level Gateway (IMS-ALG)—IMS Access Gateway (IMS-AGW); Iq Interface; Stage 3, 3GPP 29.334 V9.2.0].

It is desirable to address the above issue as identified and formulated by the present applicant.

SUMMARY

There is provided a method for updating or handling the update of a media path between a first user terminal and a second user terminal in a telecommunications network. The media path includes one or more gateway nodes. Each gateway node includes a gating function for gating media packets. Each gating function has an associated controlling function for controlling the gating function. The following steps are performed at the or each of at least one of the one or more gating functions. A message is received from its associated controlling function indicating that an update of the gating at the gating function is required in order to update from an old or previous or existing media path to a new or updated media path. It is arranged for a new gating, appropriate for the new or updated media path, to be opened while keeping an old gating, appropriate for the old or previous or existing media path, open. It is determined when media has been switched, or at least is likely to have been switched, to the new or updated media path. When it is so determined, it is arranged for the old gating to be closed.

There is also provided a method for use at the or each of at least one of the one or more controlling functions in such a method of updating or handling the update of the media path between the first user terminal and the second user terminal. An indication is received that a change or update to the media path is or may be required. If it is determined from the indication received by the controlling function that a graceful or controlled gating change is required, or if it is pre-determined that a graceful or controlled gating change is required, then it is arranged for the gating performed by its associated gating function to be updated in a graceful (or controlled) manner. If it is determined or pre-determined that a graceful or controlled gating change is not required, then it is arranged for the gating performed by its associated gating function to be updated immediately, or at least as soon as possible or after a short period of time. It is arranged for the gating performed by its associated gating function to be updated by sending an appropriate message to the gating function.

An apparatus is provided for use by the or each of at least one of the one or more gating functions in such a method of updating or handling the update of a media path between the first user terminal and the second user terminal. There is provided means (or a component or processor or other such unit) for receiving (or arranged or configured or adapted to receive) a message from its associated controlling function indicating that an update of the gating at the gating function is required in order to update from an old or previous or existing media path to a new or updated media path. There is provided means (or a component or processor or other such unit) for arranging (or arranged or configured or adapted to arrange) for a new gating, appropriate for the new or updated media path, to be opened while keeping an old gating, appropriate for the old or previous or existing media path, open. There is provided means (or a component or processor or other such unit) for determining (or arranged or configured or adapted to determine) when media has been switched, or at least is likely to have been switched, to the new or updated media path. There is provided means (or a component or processor or other such unit) for, when it is so determined, arranging (or arranged or configured or adapted to arrange) for the old gating to be closed.

An apparatus is provided for use by the or each of at least one of the one or more controlling functions in such a method of updating or handling the update of a media path between the first user terminal and the second user terminal. There is provided means (or a component or processor or other such unit) for receiving (or arranged or configured or adapted to receive) an indication that a change or update to the media path is or may be required. There is provided means (or a component or processor or other such unit) for, if it is determined from the indication received by the controlling function that a graceful or controlled gating change is required, or if it is pre-determined that a graceful or controlled gating change is required, arranging (or arranged or configured or adapted to arrange) for the gating performed by its associated gating function to be updated in a graceful (or controlled) manner. There is provided means (or a component or processor or other such unit) for, if it is determined or pre-determined that a graceful or controlled gating change is not required, arranging (or arranged or configured or adapted to arrange) for the gating performed by its associated gating function to be updated immediately. There is provided means (or a component or processor or other such unit) for arranging (or arranged or configured or adapted to arrange) for the gating performed by its associated gating function to be updated by sending an appropriate message to the gating function.

For the avoidance of doubt, in the case where the media path includes a plurality of gateway nodes, with each gateway node including a gating function and each gating function having an associated controlling function, the appended claims are to be interpreted as covering a method performed (and an apparatus for performing such a method) at a single one of those gating functions and a method performed (and an apparatus for performing such a method) at a single one of those controlling functions. This is because the method and apparatus can be considered as applying to a subset of the plurality of gateway nodes between the first user terminal and the second user terminal, which subset could include a single gateway node or several gateway nodes less than the total number of gateway nodes or all gateway nodes between the first user terminal and the second user terminal.

It may be determined that the media has been switched, or is likely to have been switched, to the new path when the new gating has received media.

It may be so determined when the new gating has received media in one of: a particular direction; either direction; and both directions.

It may be determined that the media has been switched, or is likely to have been switched, to the new path after a certain time period.

A graceful or controlled gating change may involve arranging for a new gating, appropriate for the new or updated media path, to be opened while keeping an old gating, appropriate for the old or previous or existing media path, open, at least until it is determined that media has been switched, or at least is likely to have been switched, to the new or updated media path.

A graceful or controlled gating change may involve arranging, after a certain time, for a new gating, appropriate for the new or updated media path, to be opened and for an old gating, appropriate for the old or previous or existing media path, to be closed.

The indication received by the controlling function may be carried in updated session information, and the controlling function may determine from the updated session information an affected media path and that a change to the media path is required.

The session information may comprise SDP information.

The steps may be performed on SDP offer.

The steps may be performed on SDP answer.

The telecommunications network may comprise an IMS network.

Policy and charging control may be in operation in the network.

At least the first user terminal may be connected to or via an Internet Protocol Connectivity Access Network, IP-CAN, wherein the IP-CAN implements a Policy and Charging Control, PCC, architecture.

Gating may involve passing or blocking a media packet according to its source and/or destination address.

Gating may involve passing or blocking a media packet according to a policy or rule at, such as loaded into, the gating function.

The policy or rule at the gating function may be provided by the control function associated with the gating function.

At least one gating function may comprise a PCEF, with its associated controlling function comprising a PCRF.

At least one gating function may comprise a TrGW, with its associated controlling function comprising an IBCF.

At least one gating function may comprise an IMS AGW, with its associated controlling function comprising an IMS ALG.

At least one controlling function may be in a separate node to its associated gating function.

A program is also proposed for controlling an apparatus to perform a method as herein proposed, or which, when loaded into an apparatus, causes the apparatus to become an apparatus as herein proposed. The program may be carried on a carrier medium. The carrier medium may be a storage medium. The carrier medium may be a transmission medium. An apparatus programmed by such a program is also envisaged, as is a storage medium containing such a program.

An embodiment of the present invention offers a technical advantage of addressing the issue mentioned above relating to the prior art. Technical advantages are set out in more detail below.

DETAILED DESCRIPTION

There are at least two options according to an embodiment of the present invention for addressing the above-identified problem of a voice (or other media) break during access transfer.

Option 1:

When the PCRF in the UE B's network receives the updated SDP information including a "graceful indication" from P-CSCF, it sends an indication to PCEF that the PCEF should change the gating "gracefully", that is it should open the gate for the new IP address, at the same time PCEF should keep the gate open for the old IP address of UE A until media is received at the new gate for both uplink and downlink [RFC 3264 An Offer/Answer Model with the Session Description Protocol (SDP)]. If the PCEF doesn't receive this "graceful indication" for gating, it should change the gate immediately.

The same type of mechanism would be introduced for intermediate gating functions such as the IBCF/TrGW. For these cases, the Iq/Ix interfaces would be enhanced to allow for this "graceful indication" request during the gating.

Option 2:

The PCRF in the network of UE B delays the change of gates in a pre-determined manner, in order to minimize or at least reduce the voice (or other media) break. It is based on the fact that it will take certain time for the SDP answer from UE B to reach UE A's network. The delay can be set as e.g. 150 ms.

For Option 2, the P-CSCF might indicate to the PCRF that the SDP answer in SIP 2xx was received from the UE side, and that another UE is located in a different network, so that the PCRF can apply the optimization (delay). For Option 1 this indication may be not needed, as it would up to the PCEF to judge when it should close the old gate.

Option 1 will now be considered in more detail.

Within Option 1, a first embodiment based on "Actions on SDP answer" will now be considered.

This option is to add an indication between the controlling function and the gating function, e.g., PCRF and PCEF (e.g.

PGW), which indicates explicitly that the gating function should gracefully change the gating from the old IP address to the new IP address.

Figure 1:
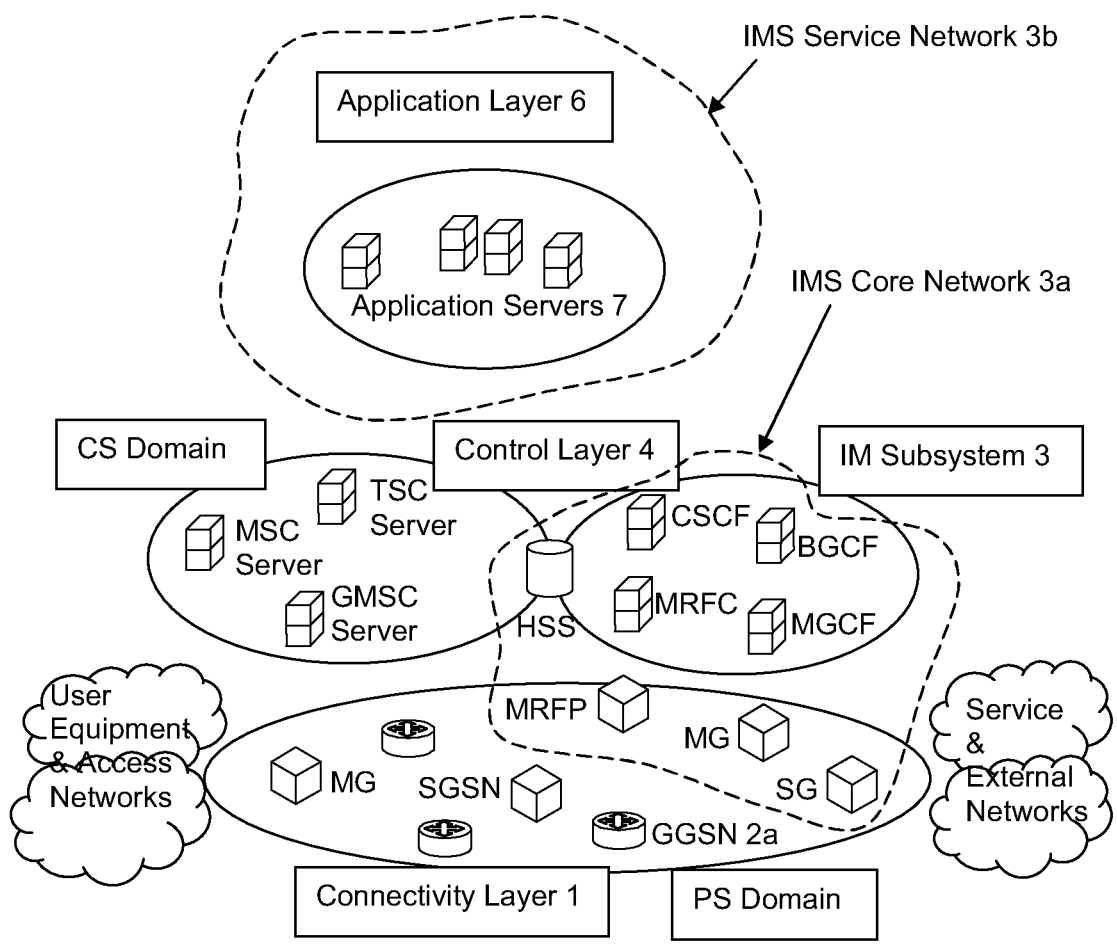
FIG. 1, discussed hereinbefore, illustrates schematically the integration of an IP Multimedia Subsystem into a 3G mobile communications system.
Figure 2A:
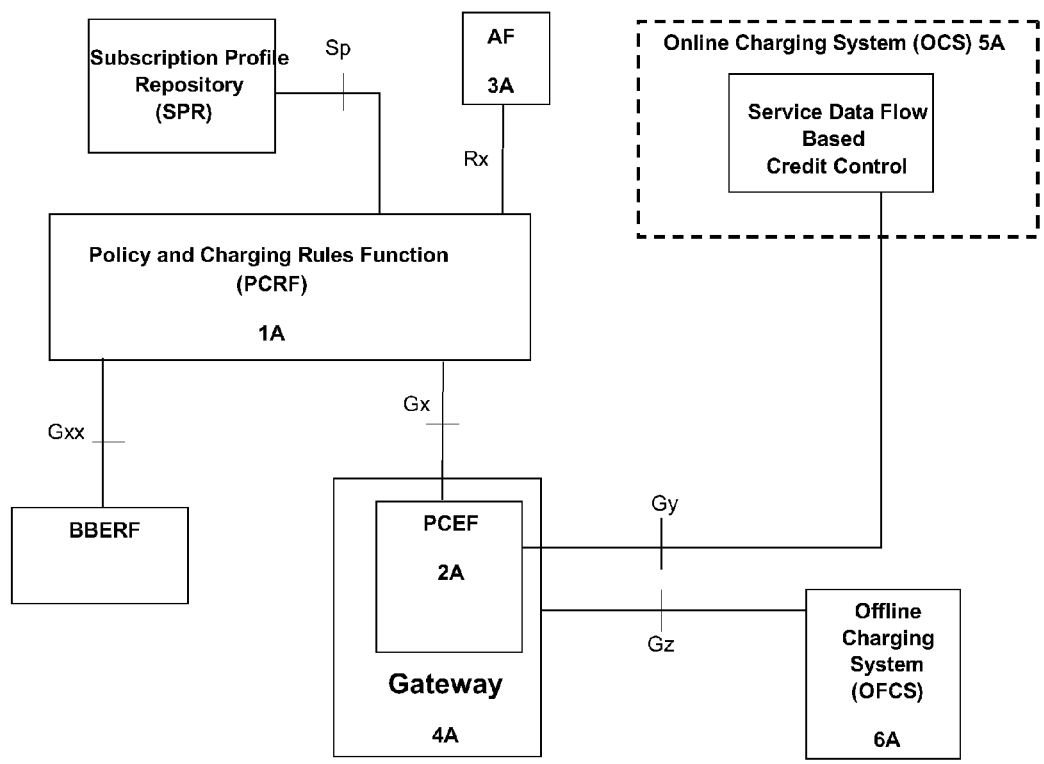
FIG. 2A, also discussed hereinbefore, illustrates an overall PCC logical architecture (non-roaming), and is derived from FIG. 5.1.1 of 3GPP TS 23.203.
Figure 2B:
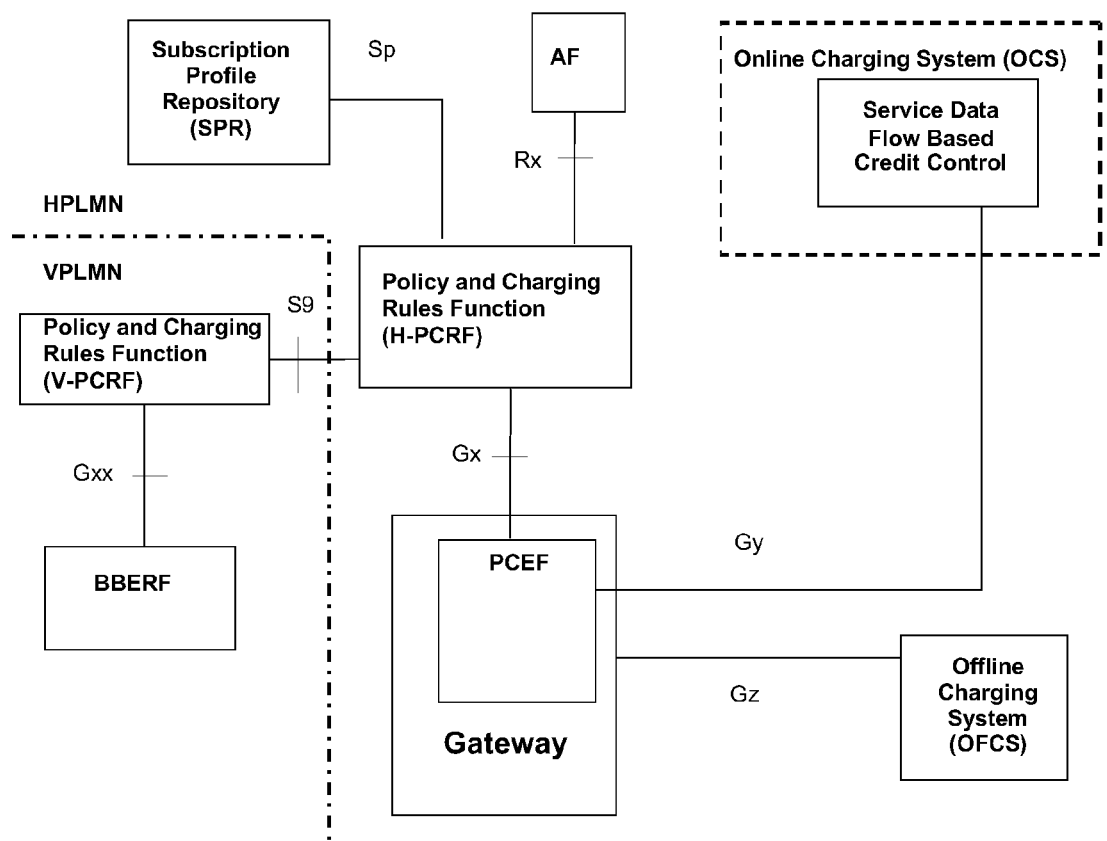
FIG. 2B, also discussed hereinbefore, illustrates an overall PCC architecture (roaming with home routed access), and is derived from FIG. 5.1.2 of 3GPP TS 23.203.
Figure 2C:
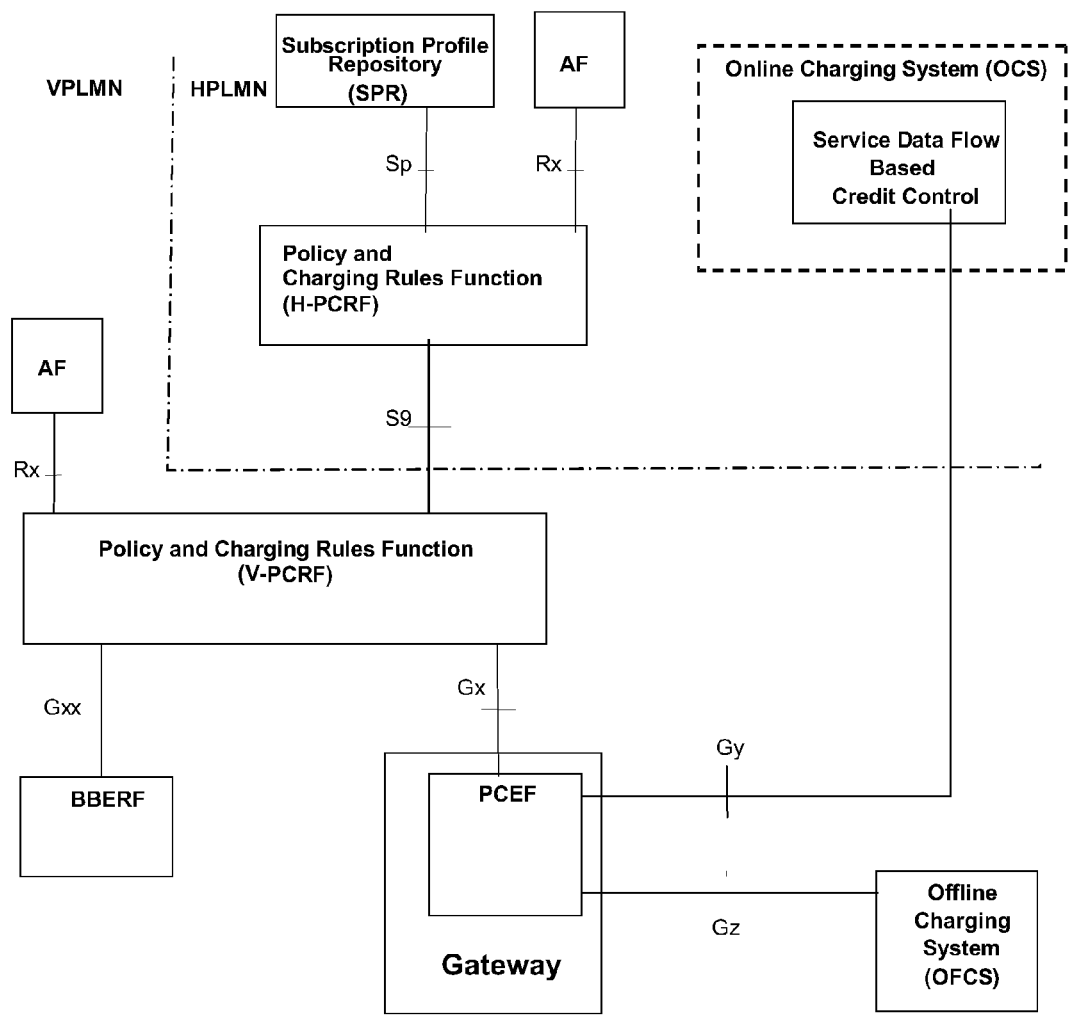
FIG. 2C, also discussed hereinbefore, illustrates an overall PCC architecture for roaming with PCEF in visited network (local breakout), and is derived from FIG. 5.1.3 of 3GPP TS 23.203.
Figure 3:
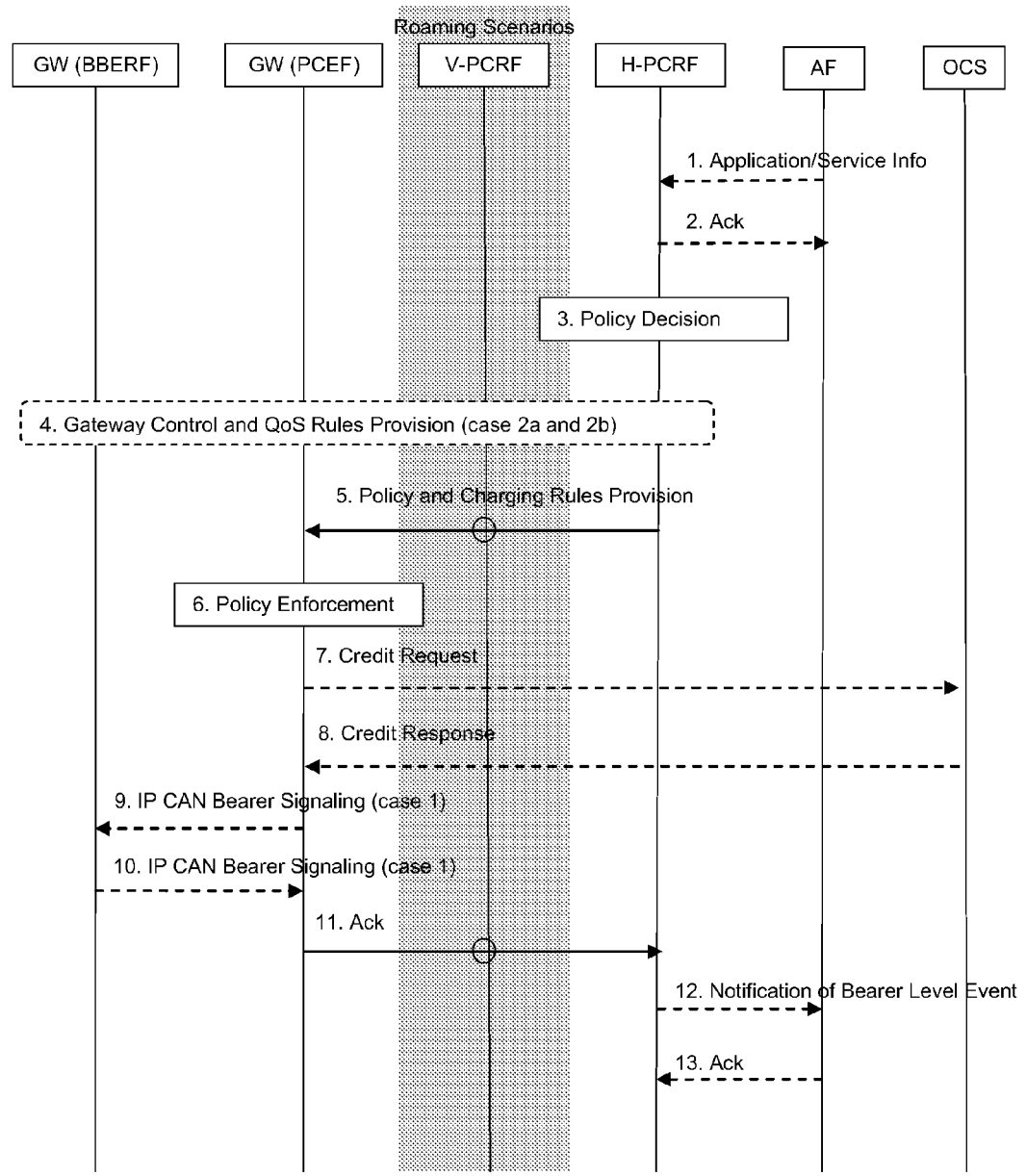
FIG. 3, also discussed hereinbefore, illustrates PCRF-initiated IP CAN Session Modification.
Figure 4:
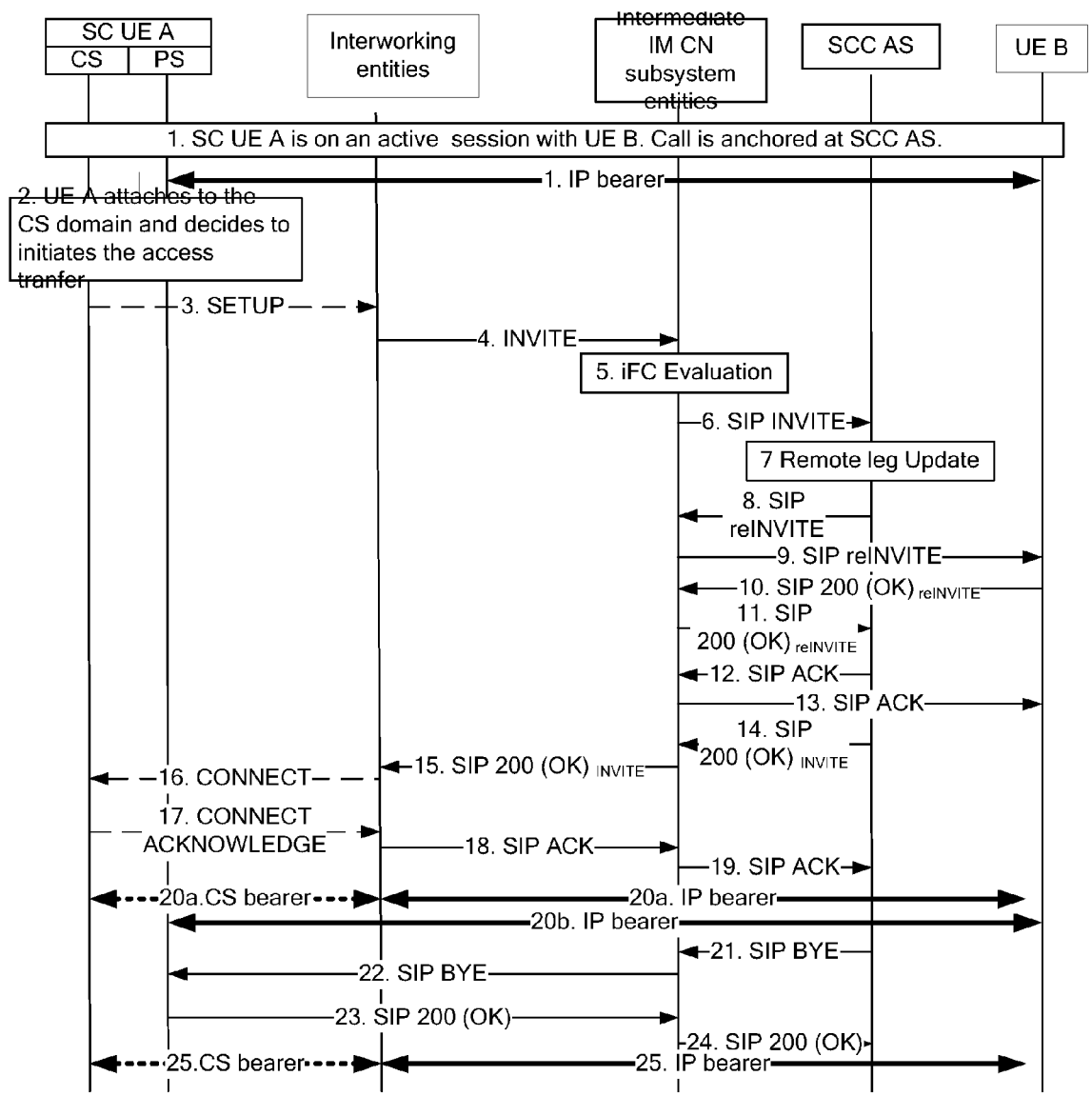
FIG. 4, also discussed hereinbefore, illustrates signalling flow for PS-CS access transfer: PS-CS.
Figure 5:
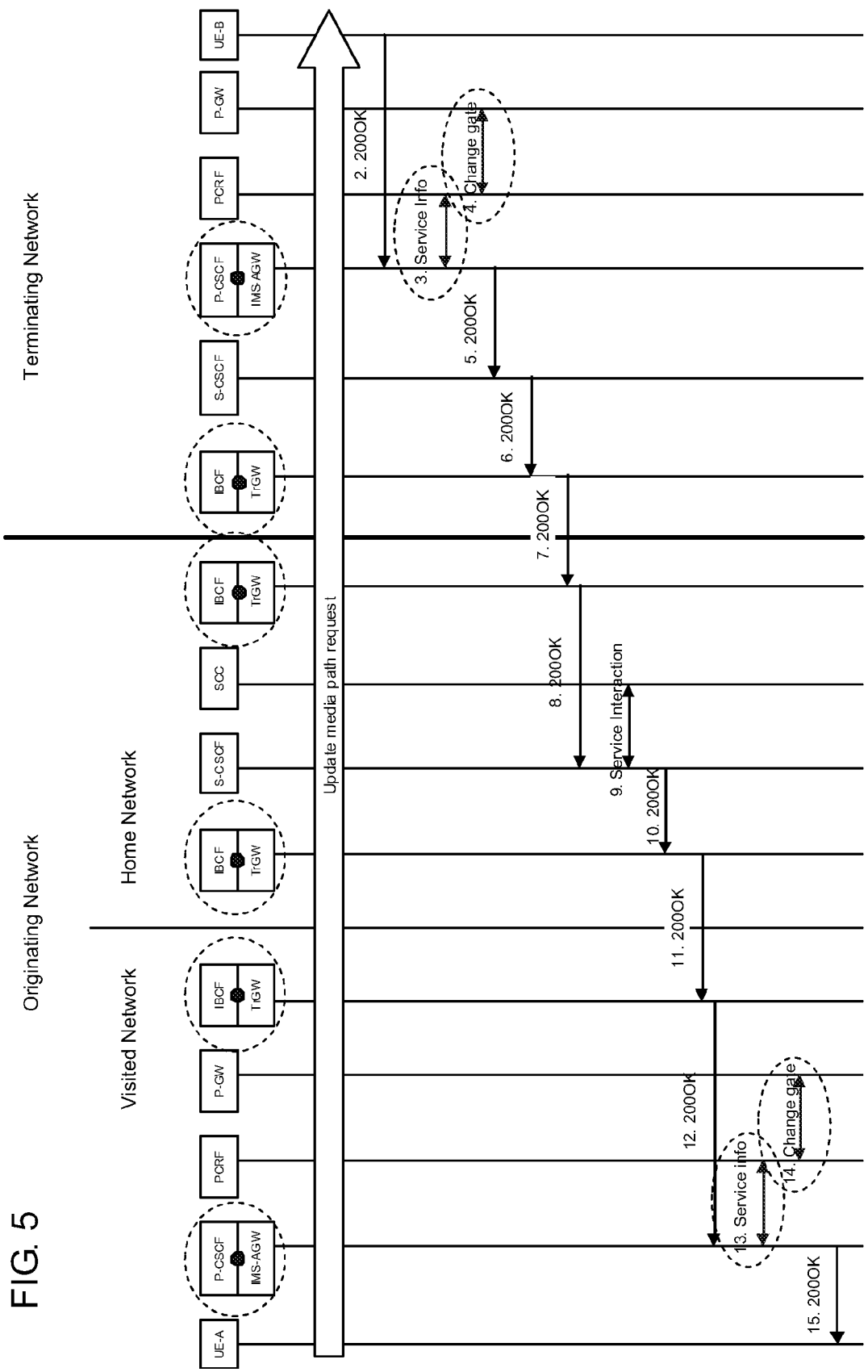
FIG. 5, also discussed hereinbefore, illustrates a signalling flow for e2e media path change.
Figure 6:
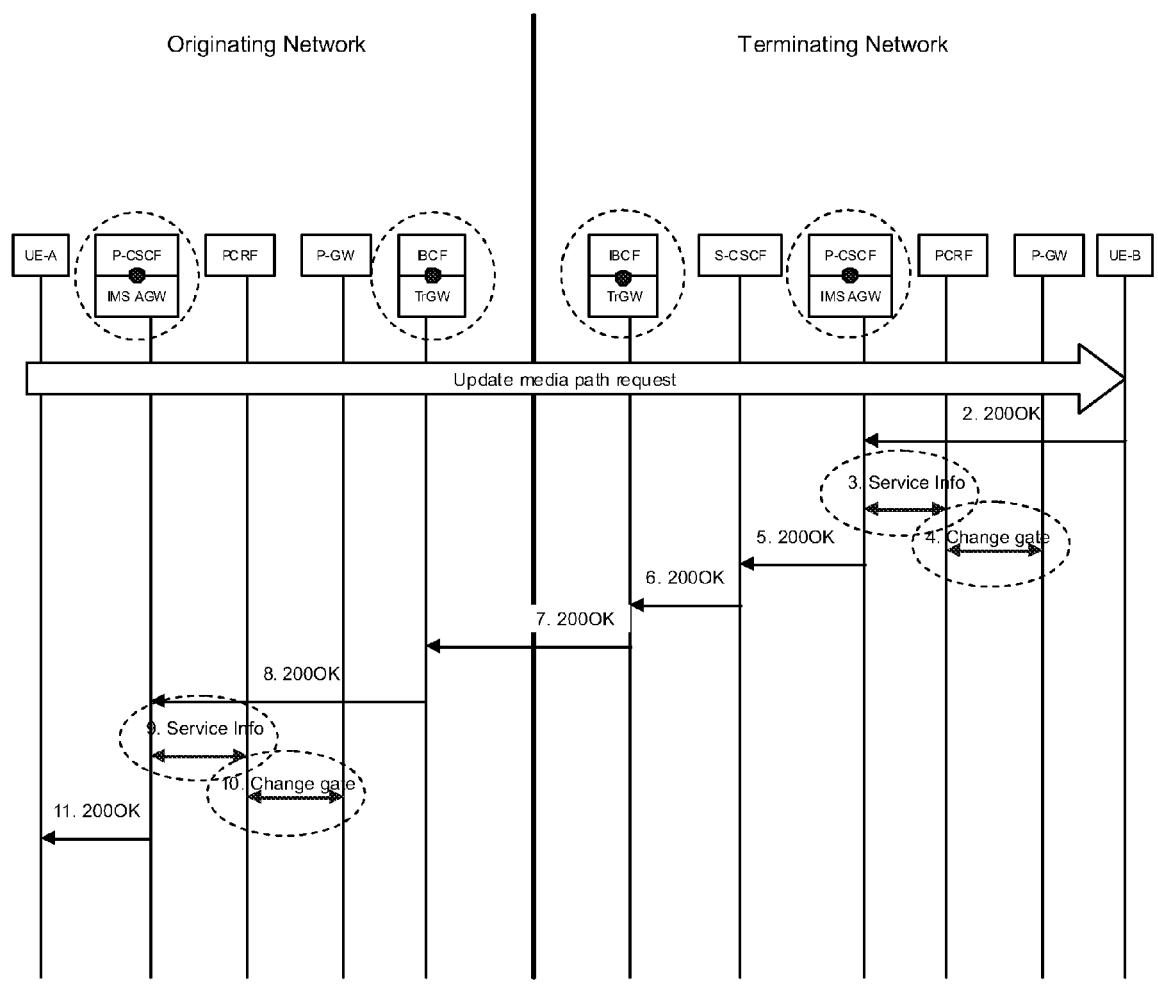
FIG. 6 illustrates signalling flow for Option 1.

Referring to FIG. 6, at step 3, the P-CSCF sends new SDP information to the PCRF. Upon checking the new SDP, the PCRF finds out that this needs a new gating and the media type is "audio", so it sends a "graceful gating change" indication to the PCEF, i.e. PGW in this case, at step 4. When the PGW receives this indication, it can change the gate gracefully according to RFC 3264 [RFC 3264 An Offer/Answer Model with the Session Description Protocol (SDP)], or by other implementation means. Some type of timer would ensure that after a period of time, the new gating will only be applied and the old will be removed.

Similarly, the IBCFs (if included in the path), when receiving the 200 OK (Step 6/7), will update the gates in the TrGW. This is then done using normal procedure, but with the addition of the "graceful gating change" indication sent from the IBCF to the TrGW.

The same procedure shall be applied to IMS AGW as well, if any of them is included in the media path.

The P-CSCF/PCRF in the originating network (step 9 and 10) applies similar procedures as was done in the terminating network to ensure the graceful change of the gates.

Within Option 1, a second embodiment based on "Actions on SDP offer" will now be considered.

While the added graceful indication will ensure that the voice gap to the remote UE will be minimized and not be interrupted due to the gating, there may still be a problem for the voice gap to the originating UE. The reason for this is that when the remote UE sends the SDP answer, it will also switch the media and start sending to the new IP address/port received in the SDP offer. However, not all gates in the path may be open to accept the media from the remote UE as the SDP answer with the information about the remote UE may not be received yet.

To help get around this problem, a further embodiment of the invention introduces a new feature of allowing the controlling functions to indicate to the gating functions during the SDP offer that the gating function soon should switch media, and therefore allow media to be received to both the old IP address (of UE-A) and the new IP address (of UE-A). Note that it may be so that the controlling function does not have the media information of the remote side, and hence will open the gate for arbitrary incoming messages.

This will then ensure that when UE-B starts sending media to the new IP address of UE-A, UE-A will be able to receive it even before the SDP answer is received. It should be noted that this constitutes a potential security and fraud problem, as it also means that during this period of time, if any of the gating functions in the originating network does not know the IP address of the terminating party, the gating function will allow traffic from any address. This could then be used maliciously (until the SDP answer is received and the gating is updated with the remote side address).

Within Option 1, an additional enhancement will now be described.

Gating was introduced to avoid fraud situations where the user sends/receives media from more than one source at the same time (and from sources that the operator has not agreed on). The graceful gating will of course during a short period of time allow media to/from multiple peers. While this may not be regarded as a problem for certain services but rather needed (such as MMTEL with Service Continuity), it may still be a problem for other services where you like to have an immediate switch of media (e.g., the UE is redirected from a media broadcast service to a notification service that tells the user that he needs to pay more to continue with the service).

This implies that there may be a need to be able to differentiate whether there is a need to do the graceful gating or not.

This enhancement extends the mechanisms in the above sections by introducing a new Private header in the SIP messages, which tells the controlling functions whether they should activate the graceful gating or not. The procedures would be as follows:

The SIP session anchor in the originating network receives the trigger that the SIP session is being updated to move to a new IP address.

The SIP session anchor decides that there is a need to use graceful gating and adds a network provided "graceful gating" header into the SIP message of the SDP Offer (i.e., P-graceful-gating).

When the SDP offer is being forwarded to the terminating side, the "Actions on SDP offer" (second embodiment of Option 1 described above) are done only in the case the P-graceful-gating header is included in the message.

When the SDP answer is sent back, the "Actions on SDP answer" procedures (first embodiment of Option 1 described above) are performed only if the P-graceful-gating header is included in the message.

Note that it is important that the header is a network provided header, and that it cannot be included by the UE. I.e., the terminating network needs to be able to trust that another network entity has asserted this.

A summary of some of the likely changes to the current system for implementing Option 1 are as follows:

New logic in all the controlling functions (P-CSCF/PCRF, IMS ALG, IBCF etc) to be able to decide if it should be allowed or not to do a graceful change during SDP answer.

New logic in all the controlling functions (P-CSCF/PCRF, IMS ALG, IBCF etc) to be able to decide if it should be allowed or not to do a graceful change during SDP offer.

Enhancement to Diameter (Rx/Gx interfaces) to allow for the graceful change indication for the gating during SDP answer.

Enhancement to H.248 (Iq/Ix interfaces) to allow for the graceful change indication for the gating during SDP answer.

New detection function in the gating functions that media has been switched to the new source/destination addresses and that the old gating can be removed.

Optional new header in SIP to indicate that the graceful gating should be used.

It will be appreciated that implementing only a part or parts of the above functions can achieve a suboptimal (but adequate) minimization or at least reduction of the voice (or other media) break during the access transfer.

Option 2 will now be considered in more detail.

This option is, when the PCRF receives service information from the P-CSCF, which includes the media type "audio", the source and destination IP address, it can therefore know whether UE-A and UE-B are in the different networks. The P-CSCF should also send an indication to the PCRF, to tell if the PCRF is in originating or terminating network.

Based on the above information, the PCRF can in a pre-determined manner delay the gating change action, e.g. for 150 ms. This will then minimize the period of the voice break due to the access transfer.

Figure 7:
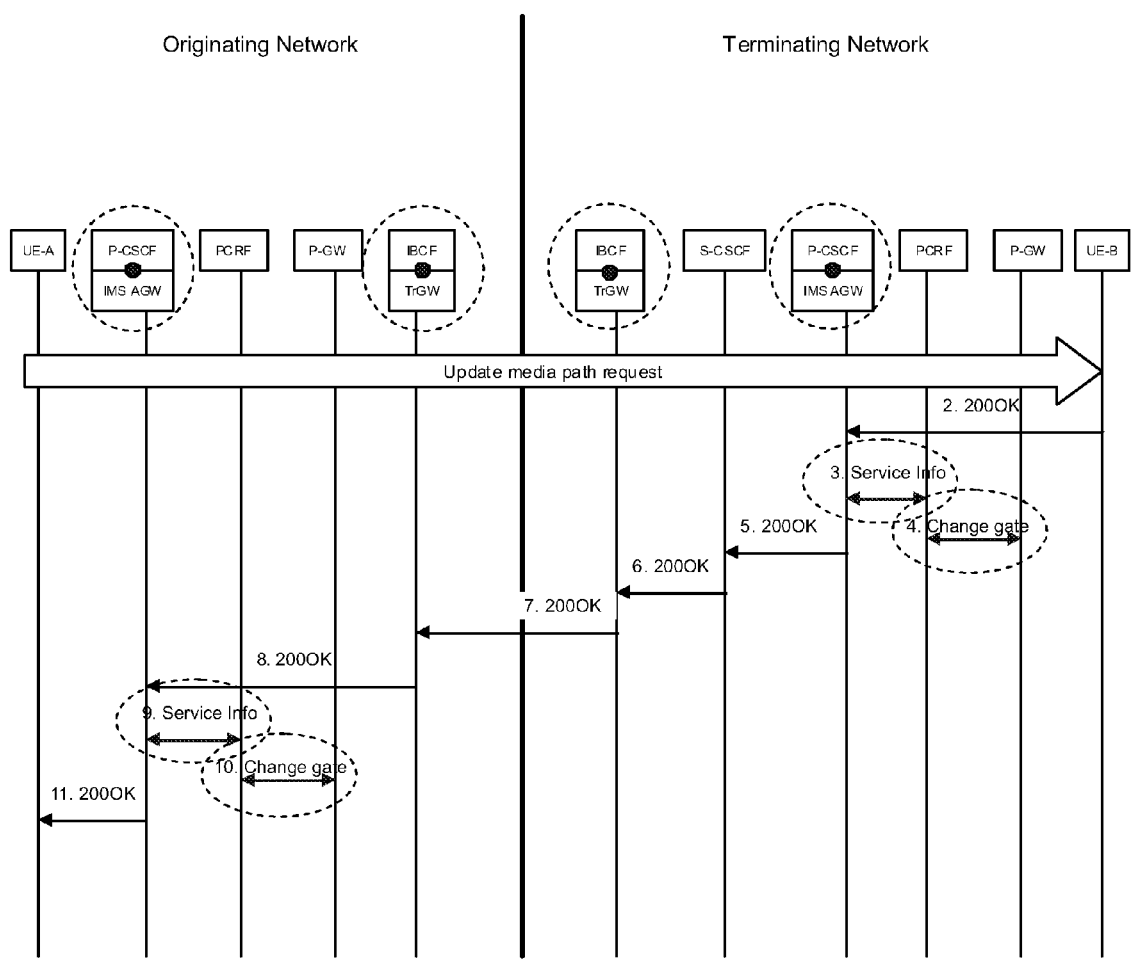
FIG. 7 illustrates signalling flow for Option 2.

Referring to FIG. 7, at step 3, the P-CSCF receives new SDP information, it sends it to the PCRF including the information of originating or terminating network. At step 4, the PCRF will accordingly delay a certain time for changing the gate for downlink traffic for UE-B.

At step 9 and 10, a similar procedure takes place. As this is in the originating network where the SDP answer is almost arriving at UE-A, the PCRF may delay a shorter time for changing the gate for uplink traffic from UE-A.

An advantage of an embodiment of the present invention is that it offers the ability to minimize or at least reduce the voice break during access transfer. It will be appreciated that where "voice" is used herein, this could equally well be some other form of media, or combination of media types.

As will be apparent from the above, a method is proposed herein for updating or handling the update of a media path between a first user terminal and a second user terminal in a telecommunications network, for example in an IMS network. Policy and charging control may be in operation. At least the first user terminal (e.g. UE) may be connected to or via an Internet Protocol Connectivity Access Network, IP-CAN, wherein the IP-CAN implements a Policy and Charging Control, PCC, architecture. An update to the media path may be required, for example, when the address (e.g. IP address) of the first and/or second user terminal changes. This could happen, for example, following a change to the access network used by the first terminal; for example, when transferring a media path of an ongoing IMS session between PS and CS access, or when transferring both the signalling and the media path of an ongoing IMS session on a UE between different IP-CANs. This might include PS-CS access transfer (both directions in some cases) and PS-PS access transfer.

The media path may include one or more gateway nodes, each gateway node including a gating function for gating media packets. For each gating function there is an associated controlling function for controlling the gating function. Such a controlling function may be in a separate node to its associated gating function. Here, gating may imply passing or blocking a media packet according to its source and/or destination address, and according to a policy or rule at (such as loaded into) the gating function.

Figure 8:
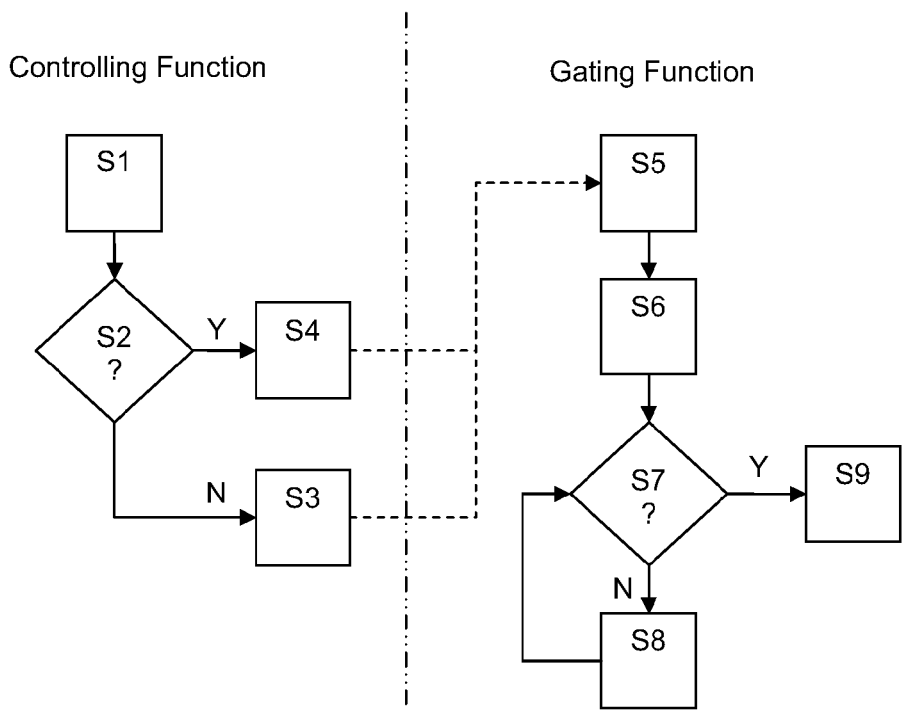
FIG. 8 is a flowchart illustrating schematically a method performed according to an embodiment of the present invention.
Figure 9:
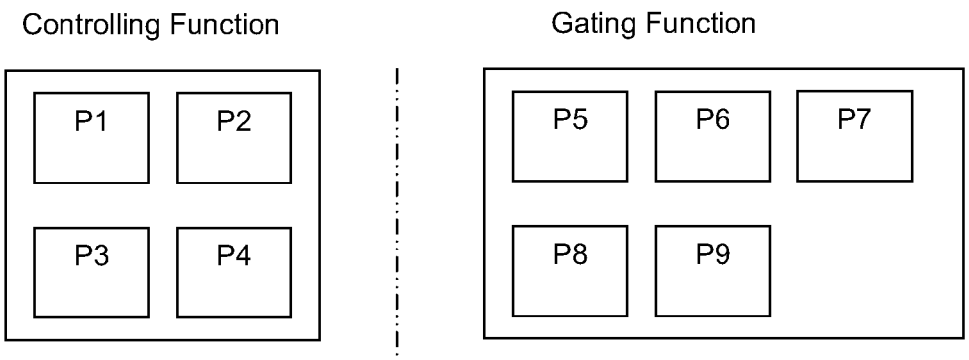
FIG. 9 is a schematic block diagram illustrating apparatus according to an embodiment of the present invention.

Steps S1 to S9 are illustrated in the schematic flowchart of FIG. 8. Corresponding parts or components or processors or transmitter/receivers P1 to P9, for performing respective steps S1 to S9, are illustrated in FIG. 9.

When an indication is received (S1) by a controlling function that a change or update to the media path is or may be required, the controlling function arranges for the gating performed by its associated gating function to be updated. If it is determined (S2) from the indication received by the controlling function that a graceful (or controlled) gating change is required, or if it is pre-determined (S2) that a graceful gating change is required (for example by hard wiring or pre-configuration), then the controlling function arranges (S4) for the gating performed by its associated gating function to be updated in a graceful (or controlled) manner. If it is determined (or pre-determined) (S2) that a graceful (or controlled) gating change is not required, then the controlling function can arrange (S3) for the gating performed by its associated gating function to be updated immediately. The controlling function arranges for the gating change by sending an appropriate message to the gating function (S3, S4).

In the case where the message received (S5) at the gating function indicates that a graceful (or controlled) update of the gating is required, the gating function arranges (S6) for a new gating (appropriate for the new or updated media path) to be opened while keeping the old gating (appropriate for the old or previous or existing media path) open. If the gating function determines (S7) that the media has been switched (or at least is likely to have been switched) to the new path, then the gating function arranges (S9) for the old gating to be closed. On the other hand, if the gating function has not yet detected (S7) that the media has been switched to the new path, the old gating is kept open (S8), and the gating function continues to check (S7) for the switching of the media to the new path.

The controlling function may be a PCRF and the gating function may be a PCEF (e.g. PGW). The controlling function may be an IBCF and the gating function may be a TrGW. The controlling function may be an IMS ALG (e.g. P-CSCF) and the gating function may be an IMS AGW. A combination of such controlling/gating function pairs may be arranged along the media path.

The indication of a media path change received in step S1 may carried in updated session information, with the controlling function determining from the updated session information an affected media path and that a change to the media path is required. The session information may comprise SDP information. The above-indicated actions could be performed on SDP answer, or on SDP offer. In the case where the controlling and gating functions are a PCRF and PCEF respectively, the session information may be communicated to the controlling function (PCRF) from a P-CSCF.

There are many ways in which the gating function can be arranged to determine (S7) that the media has been switched (or is likely to have been switched) to the new path. For example, it may be determined that the media has been switched to the new path when the new gating has received media. It may be that the determination is made when media is received in either direction or a particular direction, for example one or other of the uplink and downlink directions to/from the first and second user terminals, or it may be that the determination is made when the new gating receives media for both uplink and downlink (i.e. in both directions, to and from the first and second user terminals). In another embodiment, it is determined that the media is likely to have been switched to the new path after a certain time period (which may be predetermined or which may be determined during operation based on one or more factors) has elapsed. A timer might be used in that case at the gating function to determine when that time period has elapsed.

Changing the gating from old to new may comprise changing the gating from an old IP address (and/or optional port) to a new IP address (and/or optional port), but keeping the old IP address gating open at least for a time.

In the case where the controlling function is an IBCF and the gating function is a TrGW, the message sent in step S4 might be carried over the Ix interface, which may be enhanced to allow for an indication to be carried that a graceful (controlled) gating change is required. Where the controlling function is an IMS ALG (e.g. P-CSCF) and the gating function is an IMS AGW, the message sent in step S4 might be carried over the Iq interface, which may be enhanced to allow for an indication to be carried that a graceful (controlled) gating change is required. Where the controlling function is a PCRF and the gating function is a PCEF (e.g. PGW), the message received in step S1 might be carried over the Rx interface, and the message sent in step S4 might be carried over the Gx interface, both of which interfaces may be enhanced to allow for an indication to be carried that a graceful (controlled) gating change is required.

In a further enhancement, a new Private header is introduced in the SIP messages, which tells the controlling functions whether they should activate the graceful gating or not. This allows the possibility for one function in the originating network to control if the graceful gating should be done or not in the terminating network.

It will be appreciated that operation of one or more of the above-described components can be provided in the form of one or more processors or processing units, which processing unit or units could be controlled or provided at least in part by a program operating on the device or apparatus. The function of several depicted components may in fact be performed by a single component. A single processor or processing unit may be arranged to perform the function of multiple components. Such an operating program can be stored on a computer-readable medium, or could, for example, be embodied in a signal such as a downloadable data signal provided from an Internet website. The appended claims are to be interpreted as covering an operating program by itself, or as a record on a carrier, or as a signal, or in any other form.

Figure 10:
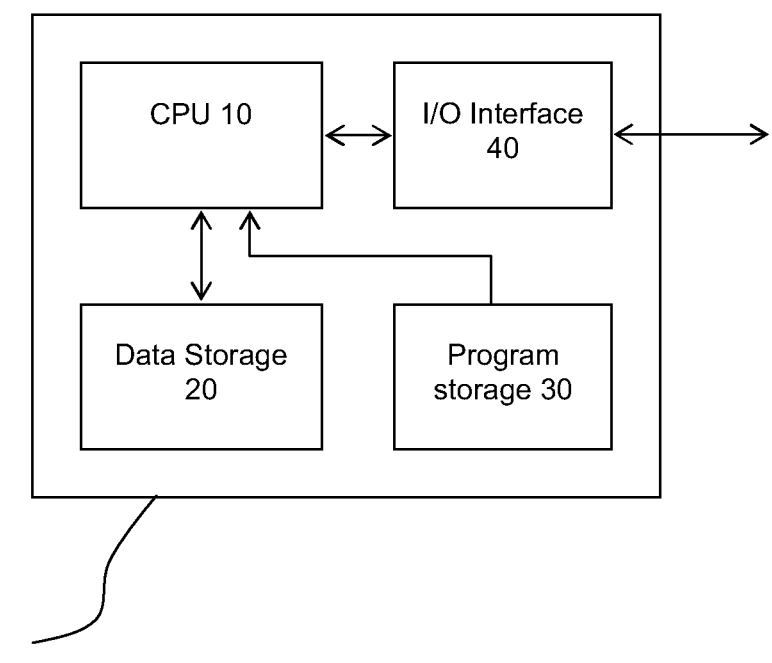
FIG. 10 is a schematic illustration of a node or apparatus in which a method embodying the present invention can be implemented.

FIG. 10 is a schematic illustration of a node 1 in which a method embodying the present invention can be implemented. A computer program for controlling the node 1 to carry out a method embodying the present invention is stored in a program storage 30. Data used during the performance of a method embodying the present invention is stored in a data storage 20. During performance of a method embodying the present invention, program steps are fetched from the program storage 30 and executed by a Central Processing Unit (CPU) 10, retrieving data as required from the data storage 20. Output information resulting from performance of a method embodying the present invention can be stored back in the data storage 20, or sent to an Input/Output (I/O) interface 40, which may comprise a transmitter for transmitting data to other nodes, as required. Likewise, the Input/Output (I/O) interface 40 may comprise a receiver for receiving data from other nodes, for example for use by the CPU 10.

Each of the appended signalling diagrams can be considered not only to depict a series of messages exchanged and method steps performed by the various nodes, but also to depict apparatus for exchanging those messages or performing those method steps.

It will be appreciated by the person of skill in the art that various modifications may be made to the above described embodiments without departing from the scope of the present invention. For example, it will be readily appreciated that although the above embodiments are described with reference to parts of a 3GPP network, an embodiment of the present invention will also be applicable to like networks, such as a successor of the 3GPP network, having like functional components.

The following references may assist the skilled person in implementing an embodiment of the present invention: 3GPP TS 23.203 v9.3.0 Policy and Charging Control Architecture (Release 8); 3GPP TS 29.212 v 9.1.0 Policy and Charging Control over Gx interface; 3GPP TS 23.401 v9.3.0 General Packet Radio Service (GPRS) enhancements for Evolved Universal Terrestrial Radio Access Network (E-UTRAN) access; 3GPP TS 23.007 v8.5.0 Restoration procedures; 3GPP TS 23.402 v9.3.0 Architecture enhancements for non-3GPP accesses; 3GPP TS 29.274 V9.1.0 Evolved General Packet Radio Service (GPRS) Tunnelling Protocol for Control plane (GTPv2-C).

The invention claimed is:

1. A method for updating or handling the update of a media path between a first user terminal and a second user terminal in a telecommunications network, where the media path includes one or more gateway nodes, each gateway node includes a gating function for gating media packets, and each gating function has an associated controlling function for controlling the gating function, the method comprising, at the or each gating function:

(a) receiving a message from its associated controlling function indicating that an update of the gating at the gating function is required in order to update from an old or previous or existing media path to a new or updated media path;

(b) arranging for a new gating, appropriate for the new or updated media path, to be opened while keeping an old gating, appropriate for the old or previous or existing media path, open;

(c) determining when media has been switched, or is estimated to have been switched, to the new or updated media path; and (d) upon determining the media has been switched or is estimated to have been switched to the new or updated media path, arranging for the old gating to be closed.

2. The method as claimed in claim 1, wherein it is determined that the media has been switched, or is estimated to have been switched, to the new path when the new gating has received media.

3. The method as claimed in claim 1, wherein it is determined that the media has been switched, or is estimated to have been switched, to the new path after a certain time period.

4. A method for updating or handling the update of a media path between a first user terminal and a second user terminal in a telecommunications network, where the media path includes one or more gateway nodes, each gateway node includes a gating function for gating media packets, and each gating function has an associated controlling function for controlling the gating function, the method comprising, at the or each controlling function:

(a) receiving an indication that a change or update to the media path is or is estimated to be required;

(b) when it is determined from the indication received by the controlling function that a controlled gating change is required, or when it is pre-determined that a controlled gating change is required, arranging for the gating performed by its associated gating function to be updated in a controlled manner;

(c) when it is determined or pre-determined that a controlled gating change is not required, arranging for the gating performed by its associated gating function to be updated immediately; and (d) arranging for the gating performed by its associated gating function to be updated by sending an appropriate message to the gating function.

5. The method as claimed in claim 4, wherein the controlled gating change involves arranging for a new gating, appropriate for the new or updated media path, to be opened while keeping an old gating, appropriate for the old or previous or existing media path, open, at least until it is determined that media has been switched, or is estimated to have been switched, to the new or updated media path.

6. The method as claimed in claim 4, wherein the controlled gating change involves arranging, after a certain time, for a new gating, appropriate for the new or updated media path, to be opened and for an old gating, appropriate for the old or previous or existing media path, to be closed.

7. The method as claimed in claim 4, wherein the indication received in step (a) is carried in updated session information, with the controlling function determining from the updated session information an affected media path and that a change to the media path is required.

8. The method as claimed in claim 7, wherein the session information comprises Session Description Protocol (SDP) information.

9. The method as claimed in claim 8, comprising performing the steps on Session Description Protocol (SDP) offer.

10. The method as claimed in claim 8, comprising performing the steps on Session Description Protocol (SDP) answer.

11. The method as claimed in claim 1, wherein the telecommunications network comprises an IP Multimedia Subsystem (IMS) network.

12. The method as claimed in claim 1, wherein policy and charging control is in operation in the network.

13. The method as claimed in claim 12, wherein at least the first user terminal is connected to or via an Internet Protocol Connectivity Access Network (IP-CAN), wherein the IP-CAN implements a Policy and Charging Control (PCC) architecture.

14. The method as claimed in claim 1, wherein gating comprises passing or blocking a media packet according to its source and/or destination address, and according to a policy or rule at, such as loaded into, the gating function.

15. The method as claimed in claim 14, wherein the policy or rule at the gating function is provided by the control function associated with the gating function.

16. The method as claimed in claim 1, wherein at least one gating function comprises a Policy and Charging Enforcement Function (PCEF), with its associated controlling function comprising a Policy and Charging Rules Function (PCRF).

17. The method as claimed in claim 1, wherein at least one gating function comprises a Transition Gateway (TrGW), with its associated controlling function comprising an Interconnection Border Control Function (IBCF).

18. The method as claimed in claim 1, wherein at least one gating function comprises an IP Multimedia Subsystem (IMS) Access Gateway (AGW), with its associated controlling function comprising an IMS Application Layer Gateway (ALG).

19. The method as claimed in claim 1, wherein at least one controlling function is in a separate node to its associated gating function.

20. An apparatus for updating or handling the update of a media path between a first user terminal and a second user terminal in a telecommunications network, where the media path includes one or more gateway nodes, each gateway node includes a gating function for gating media packets, and each gating function has an associated controlling function for controlling the gating function, the apparatus comprising, for use at the or each gating function:

(a) means for receiving a message from its associated controlling function indicating that an update of the gating at the gating function is required in order to update from an old or previous or existing media path to a new or updated media path;

(b) means for arranging for a new gating, appropriate for the new or updated media path, to be opened while keeping an old gating, appropriate for the old or previous or existing media path, open;

(c) means for determining when media has been switched, or is estimated to have been switched, to the new or updated media path; and (d) means for, upon determining the media has been switched or is estimated to have been switched to the new or updated media path, arranging for the old gating to be closed.

21. An apparatus for updating or handling the update of a media path between a first user terminal and a second user terminal in a telecommunications network, where the media path includes one or more gateway nodes, each gateway node includes a gating function for gating media packets, and each gating function has an associated controlling function for controlling the gating function, the apparatus comprising, for use at the or each controlling function:

(a) means for receiving an indication that a change or update to the media path is or is estimated to be required;

(b) means for, when it is determined from the indication received by the controlling function that a controlled gating change is required, or when it is pre-determined that a controlled gating change is required, arranging for the gating performed by its associated gating function to be updated in a controlled manner;

(c) means for, when it is determined or pre-determined that a controlled gating change is not required, arranging for the gating performed by its associated gating function to be updated immediately; and (d) means for arranging for the gating performed by its associated gating function to be updated by sending an appropriate message to the gating function.

22. The apparatus as claimed in claim 21, wherein the controlled gating change involves arranging for a new gating, appropriate for the new or updated media path, to be opened while keeping an old gating, appropriate for the old or previous or existing media path, open, at least until it is determined that media has been switched, or is estimated to have been switched, to the new or updated media path.

23. The apparatus as claimed in claim 21, wherein the controlled gating change involves arranging, after a certain time, for a new gating, appropriate for the new or updated media path, to be opened and for an old gating, appropriate for the old or previous or existing media path, to be closed.

24. An apparatus for updating or handling the update of a media path between a first user terminal and a second user terminal in a telecommunications network, where the media path includes one or more gateway nodes, each gateway node includes a gating function for gating media packets, and each gating function has an associated controlling function for controlling the gating function, the apparatus for use at the or each gating function comprising:

at least one processor; and, at least one memory that stores processor-executable instructions, wherein the at least one processor interfaces with the at least one memory to execute the processor-executable instructions, whereby said apparatus is operable to:

receive a message from its associated controlling function indicating that an update of the gating at the gating function is required in order to update from an old or previous or existing media path to a new or updated media path;

arrange for a new gating, appropriate for the new or updated media path, to be opened while keeping an old gating, appropriate for the old or previous or existing media path, open;

determine when media has been switched, or is estimated to have been switched, to the new or updated media path; and upon determining the media has been switched or is estimated to have been switched to the new or updated media path, arrange for the old gating to be closed.

25. An apparatus for updating or handling the update of a media path between a first user terminal and a second user terminal in a telecommunications network, where the media path includes one or more gateway nodes, each gateway node includes a gating function for gating media packets, and each gating function has an associated controlling function for controlling the gating function, the apparatus for use at the or each controlling function comprising:

at least one processor; and, at least one memory that stores processor-executable instructions, wherein the at least one processor interfaces with the at least one memory to execute the processor-executable instructions, whereby said apparatus is operable to:

receive an indication that a change or update to the media path is or is estimated to be required;

when it is determined from the indication received by the controlling function that a controlled gating change is required, or when it is pre-determined that a controlled gating change is required, arrange for the gating performed by its associated gating function to be updated in a controlled manner;

when it is determined or pre-determined that a controlled gating change is not required, arranging for the gating performed by its associated gating function to be updated immediately; and arrange for the gating performed by its associated gating function to be updated by sending an appropriate message to the gating function.

26. The apparatus as claimed in claim 25, wherein the controlled gating change involves arranging for a new gating, appropriate for the new or updated media path, to be opened while keeping an old gating, appropriate for the old or previous or existing media path, open, at least until it is determined that media has been switched, or is estimated to have been switched, to the new or updated media path.

27. The apparatus as claimed in claim 25, wherein the controlled gating change involves arranging, after a certain time, for a new gating, appropriate for the new or updated media path, to be opened and for an old gating, appropriate for the old or previous or existing media path, to be closed.

* * * * *